United States Patent Office.

ALVORD M. COX, OF ELIZABETH, NEW JERSEY.

Letters Patent No. 66,301, dated July 2, 1867.

IMPROVED MEDICAL COMPOUND.

*The Schedule referred to in these Letters Patent and making part of the same.*

TO ALL WHOM IT MAY CONCERN:

Be it known that I, ALVORD M. COX, of Elizabeth, Union county, New Jersey, have invented a new and improved Medical Compound; and I do hereby declare that the following is a full, clear, and exact description thereof, which will enable others skilled in the art to make and use the same.

The present invention relates to a medical compound especially designed for the relief and cure of colds, coughs, and other similar complaints.

This compound is formed of the ingredients hereinafter named, and mixed together in or about the proportions stated, and prepared in the manner described: Two (2) ounces wild cherry bark, two (2) ounces elecampane, two (2) ounces white balsam, two (2) ounces hoarhound, one (1) ounce comfrey, one (1) ounce Iceland moss, two (2) ounces juniper berries.

The several ingredients above named are first boiled in three quarts of water until reduced in quantity to two quarts, when, being then strained off, add three pounds of sugar, and again boil down to a quart, when, adding a cupful of distilled spirits, the compound is ready for being bottled.

Having thus described my invention, what I claim as new, and desire to secure by Letters Patent, is—

The medical compound formed of the ingredients mixed together in or about the proportions substantially as described for the purpose specified.

The above specification of my invention signed by me this 3d day of June, 1867.

ALVORD M. COX.

Witnesses:
WM. F. McNAMARA,
ALBERT W. BROWN.